3,721,626
DESCALING METHOD AND COMPOSITION OF
ALKALI METAL HYDROXIDE
Milan Stanek, Vysni Lhoty, and Jiri Mostecky, Prague,
Czechoslovakia, assignors to Valcovny Plechu, Narodni
Podnik, Frydek-Mistek, Czechoslovakia
No Drawing. Filed Feb. 3, 1969, Ser. No. 797,379
Int. Cl. C02b 5/02
U.S. Cl. 252—81        12 Claims

ABSTRACT OF THE DISCLOSURE

A concentrate for use in alkaline descaling baths is formed of alkali metal hydride and alkali metal oxide as active descaling constituents, dispersed or dissolved in alkali metal hydroxide, the latter being present in a sufficient amount to passivate the active descaling constituents prior to introduction of the concentrate into the descaling bath. Generally alkali will be sodium.

BACKGROUND OF THE INVENTION

The present invention relates to a descaling composition and method and particularly is concerned with the preparation of reducing alkali descaling baths so that quickly and safely descaling baths of the desired concentartion of active constituents for any given operating conditions, for instance a metallurgical and mechanical engineering operation will be obtained or replenished.

Solutions of alkali metal hydrides in alkali metal hydroxides were used for a long time for the removal of metal oxides from the surface of metallic bodies. This descaling procedure may be simply expressed by the following equation:

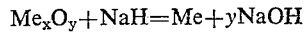

$$Me_xO_y + NaH = Me + yNaOH$$

This method may be used for the descaling of various types of cast iron, steel, refined steel, nickel and copper and alloys thereof, and rare metals. Chromium oxides are reduced only into the bivalent form.

For carrying out hydride pickling, the material to be descaled is generally dipped into a molten hydride bath at a temperature of between about 370 and 380° C. After removing the material from the bath and allowing excess melt to drip off, the descaled material is cooled and washed with water. Thereafter follows a final pickling in baths of various aqueous acids for the purpose of removing the wipable sludge from the surface and in this manner a clean metallic surface is obtained.

Various manners were proposed for producing the pickling or alkali descaling baths which contain hydrides as the effective constituent.

Frequently a direct synthesis starting with sodium and hydrogen is used, as disclosed by several patents. The initial danger of proceeding in this manner has been reduced by a series of constructional protective measures but has not been totally removed. Furthermore, the preparation of a hydride bath by synthesis of the sodium or the like hydride within the mass is limited to a large scale preparation only, particularly to plants which are able to supply the required hydrogen gas. For this reason, it has been attempted to modify this method so that it can also be utilized in plants which do not have their own production facilities for hydrogen gas. For instance, Delille described in "Stahl and Eisen," 84 (1964), page 1868, the preparation of a hydride bath by means of an eutectic solid melt of sodium and potassium lyes enriched with sodium hydride, or, according to another embodiment, enriched with pieces of sodium hydride which are protected against contact with the surrounding atmosphere by a coating of solid sodium hydroxide. According to another method, disclosed in the Belgian Patent No. 659,951, a mixture of 10–90% sodium hydride with 90–10% sodium hydroxide is used for the bath and this mixture is prepared by mixing both components at between −10 and 50° C. and by compressing the thus-obtained mixture. A more or less similar idea is developed in Belgian Patent No. 660,019, according to which it is also suggested to protect the hydrides by a coating of sodium hydroxide.

It is a disadavntage of the classical procedures utilizing sodium hydride as a constituent to be introduced into the descaling bath, that additional operations are required in order to achieve the desired clean metallic surface.

According to the conventional hydride processes the mere pickling does not result in a shining metal surface and, consequently additional processing is required. Such additional processing frequently consist of additional pickling in acids such as hydrochloric acid, nitric acid or hydrofluoric acid, followed by neutralizing in sodium carbonate solution, rinsing with water and blasting with sand and water.

More recently it has been discovered that it is possible to control the properties of the hydride solution and to increase their efficiency by the presence of alkali metal, preferably sodium oxide within certain ranges of concentration, depending upon the degree of oxidation to which the material may be subjected and particularly the carbon content thereof. Thereby the obtaining of a bright surface on the thus decontaminated material is greatly facilitated.

The oxidation referred to hereinabove is meant to indicate the reaction possible between the metal surface and the oxygen of the air, at various temperatures, particularly high temperatures with formation of metal oxides or sinter. The desired concentration of sodium oxide in the pickling bath will depend to a considerable extent on the amount of sinter and the types of materials in which the presence of sodium oxide is particularly desirable include various types of steel as well as alloys. However, new problems are introduced into the pickling process when it is desired or required to utilize, in addition to alkali metals hydrides, also alkali metal oxides so that both of these materials have to be introduced into the bath.

It is an object of the present invention to provide a concentrate for use in alkaline descaling baths and a method of preparing a reducing alkaline descaling bath, which—although sodium oxide is utilized in addition to sodium hydride—can be manipulated in a particularly simple, economical, effective and safe manner.

SUMMARY OF THE INVENTION

According to the present invention a concentrate is proposed for use in alkaline descaling baths, which concentrate consists essentially of alkali metal hydride and alkali metal oxide as the active descaling constituents, and of alkali metal hydroxide, the latter being present in an amount sufficient to passivate the active descaling constituents prior to the introduction of the concentrate into the descaling bath. Generally, the alkali metal will be sodium.

Preferably, the concentrate will contain between about 5 and 50% by weight of the alkali metal hydride and between about 1 and 20% by weight of the alkali metal oxide, and generally best results are achieved with a concentration of between about 10 and 15% by weight alkali metal hydride and between about 8 and 14% alkali metal oxide in the concentrate, the balance consisting essentially of alkali metal hydroxide but to a relatively small extent also of impurities such as alkali metal carbonate. As pointed out above, in most cases the akali metal will be sodium. The introduction of the concentrate into the descaling bath may be carried out at a temperature of the concentrate at which the same is solid, i.e. up to about 40° C. or at a temperature at which the concentrate is in molten condition with the hydride and the oxide more or less dissolved in the hydroxide, i.e. at temperatures between about 320 and 450° C. It is possible but less advantageous to operate in the temperature range between about 40 and 320° C. The concentrate may be formed by reacting alkali metal hydroxide and free alkali metal with hydrogen gas at a pressure of between about 1 and 100 atmospheres, preferably at superatmospheric pressure, and at temperatures of between about 250 and 450° C.

DESCRIPTION OF THE PREFERRED EMBODIMENTS

According to the present invention, the alkali metal oxide and the alkali metal hydride are jointly introduced into the descaling bath in a passivated form, i.e. dissolved or dispersed in alkali metal hydride. Passivation is carried out, as pointed out above by distributing the active constituents of the bath in molten alkali metal hydroxide, either dissolving the active constituents or, in the case of higher concentrations thereof, dispersing the active constituents in the molten alkali metal hydroxide. For instance, it is possible to first produce the sodium hydride and separately the sodium oxide and then to dissolve, or at higher concentrations suspend, the hydride and oxide in alkali metal hydroxide, and to utilize the thus-obtained "passivated concentrate" for preparing the descaling bath.

The passivated concentrate of the present invention has several significant advantages such as the fact that transportation and storage thereof can be carried out without danger particularly since the passivated mixture will not be subject to self-ignition as for instance sodium hydride or sodium in contact with water. Furthermore, the passivated mixture permits in a simple manner and without difficulties exact dosing of the amounts of active constituents which are to be introduced into the descaling bath. Furthermore, utilization of the passivated mixture is possible also in locations where hydrogen gas is not available.

Due to the simultaneous introduction of the two active constituents, namely the hydride and the oxide, into the descaling bath, it is possible to operate at higher temperatures since the bath will not be subject to decomposition. This, i.e. the higher operating temperature of the descaling bath increases the speed of descaling and reduces the amount of descaling bath liquid which is carried out of the bath with the treated metal bodies.

Generally, descaling baths and also the concentrate of the present invention will include small proportions of impurities such as sodium carbonate which practically unavoidably is formed of the sodium hydroxide, although only in a relatively small proportion. The sodium carbonate does not play a significant part in the descaling process and thus the exact proportion thereof is of no importance, except that it is of course desirable to keep the contents of sodium carbonate as small as operating conditions permit.

In accordance with the present invention, the reducing alkaline descaling baths may be prepared in such a manner that the active substances of the descaling bath, particularly the alkali metal hydride and alkali metal oxide are simultaneously introduced in a passivated form. The passivation of the two active components, i.e. the hydride and the oxide is achieved by dissolving or dispersing the active constituents in molten alkali metal hydroxide, or by producing the active components in molten alkali metal hydroxide by the reaction of metallic sodium, hydrogen gas under pressure and sodium hydroxide. It is noted that throughout the present specification the terms alkali metal and sodium are used, inasmuch as the present invention may be carried out with any one of the alkali metals, however, preferably is carried out with sodium, i.e. sodium hydride, sodium oxide and sodium hydroxide.

One manner of producing such passivated composition containing the active constituents of the descaling bath is described in detail in U.S. patent application Ser. No. 753,870 assigned to the same assignee as the present application and the contents of which are incorporated herein by reference.

It is then proposed according to the present invention to proceed in such a manner that the previously prepared passivated composition having a relatively high content of active constituents is introduced into the molten descaling bath either in the solid form at a temperature between 0–50°, or in liquid till pasty form at a temperature 320–450° C. In cases where the passivated concentrate is to be prepared far distant from the descaling operation, the concentrate will be cooled during storage and/or transportation to about ambient temperature or as indicated herein generally to a temperature of between about 0 and 50° C. At such relatively low temperature the concentrate is solid and it may be introduced into the descaling bath without prior heating.

However, if the passivated concentrate is produced in the immediate vicinity of the descaling operation, then it is possible to utilize the heat content of the freshly produced passivated concentrate and to introduce the concentrate in molten condition into the descaling bath, i.e. at a temperature within the range of between about 320 and 450° C.

It would also be possible, and broadly is within the scope of the present invention, to introduce the passcivated concentrate having a temperature of between 50 and 320° C., i.e. while still warm but already solidified. However, generally it is not advantageous because it would mean that cooled concentrate would have to be reheated and if such reheating is desired or necessary, then is preferably is carried out up to the higher temperature above 320° C. so that the concentrate may be introduced in molten form.

The concentration of the active constituents in the passivated mixture may be adjusted as desired, depending on the type of material used and on the extent of its oxidation contamination and carbon content.

Generally, it is proposed that the concentrate should contain between 5 and 50%, preferably between 10 and 15% by weight of the alkali metal hydride, preferably sodium hydride, between 1 and 20%, preferably between 8 and 14% of the alkali metal oxide, the balance being alkali metal hydroxide and relatively small proportions of unavoidable impurities such as alkali metal carbonate.

Upon introduction the descaling bath, the hydride content is generally reduced to between about 1 and 2% and the oxide content to between 0.5 and 1.2%, the balance consisting essentially of sodium hydroxide or the like.

For metals which are strongly oxidized on their surface, a mixture is used which contains a larger proportions of effective constituents, particularly the hydride. This is necessary because during the descaling, the amount of hydride which is consumed depends primarily on the amount of oxides present. The higher the carbon content of the steel or the like, the higher should be the soduim oxide content of the descaling bath.

As pointed out above, by introducing the concentrate having a temperature of between about 320 and 450° C., heat is supplied to the bath whereas upon introduction of the cold concentrate, such heat must be supplied from an extraneous source. For this reason, wherever possible, it is more advantageous to introduce the concentrate in hot condition. Generally it has been found that the process of the present invention, including the descaling, requires less heat than the conventional hydride descaling processes since a portion of the heat is consumed outside the descaling bath, i.e. at the point of product of the passivated concentrate.

The method of the present invention, thus provides for greater simplicity and economical as well as technical advantages in preparing and operating baths of the above-described type and, of course, is particularly advantageous in cases where no source of gaseous hydrogen is available at the location of the descaling operation.

Furthermore, it is possible according to the present invention to control in a particularly simple and economical manner the ratio, and the maintenance of the desired ratio, between sodium hydride and sodium oxide by adjusting the relative concentration of these active constituents in the passivated concentrate which is introduced into the descale bath.

The following examples are given as illustrative only without, however, limiting the invention to the specific details of the examples.

EXAMPLE 1

Into a descaling bath maintained in a pickling tank and comprising 7500 kg. of molten sodium hydroxide at a temperature of 400° C., a passivated concentrate is introduced in the amount of 600 kg. The concentrate contains about 20% by weight of sodium hydride and about 8% by weight of sodium oxide, the balance, apart from insignificant amounts of impurities, consisting of sodium hydroxide. The concentrate is introduced at a temperature of about 400° C., or may be introduced in solid, cold condition and in such case will be molten by contact with the hot sodium hydroxide in the tank. After thus mixing, or first melting and then dissolving the concentrate, the solution is analyzed and found to contain 1.1% sodium hydride which is about 0.3% less than the amount which theoretically should be found. The lower content of sodium hydride is due to a dehydration reaction and partially also due to heat decomposition. The bath prepared in this manner was excellently suitable for descaling alloyed materials, particularly alloyed steel, whereby in many cases directly and without any further treatment a metallic clear surface was obtained on the descaled material.

The above-mentioned dehydration reaction is meant to denote the removal of residual water from the molten sodium hydroxide which is accomplished with a limited consumption of sodium hydride. The sodium hydride consumption required for this purpose is mainly responsible for the finding of only 1.1% sodium hydride in the bath, instead of the 1.4% which actually were introduced.

EXAMPLE 2

480 grams sodium hydride, 100 grams sodium oxide and 2000 grams sodium hydroxide are introduced into an autoclave having a volume of 5 liters. The autoclave was then closed and then purged with nitrogen gas. Thereafter, it was heated up to a temperature of 375° C. and maintained at this temperature for a period of 10 minutes, followed by cooling. The contents of the autoclave were then removed therefrom and successfully used for maintaining the hydride content of a labratory descaling bath at the desired concentration of 1.6%.

EXAMPLE 3

Into a pickling bath containing 1500 grams of molten descaling composition having a sodium hydride content of 0.6% and a sodium oxide content of 0.2%, the balance being sodium hydroxide and impurities, a liquid reaction mixture obtained by the reaction of 120 parts of sodium hydroxide, 34 parts of sodium and hydrogen under pressure, was introduced until a sodium hydride concentration of 0.9% was obtained. This desirable concentration was maintained during the pickling procedure, which was carried out at a temperature of 380° C., by further additions of the thus prepared concentrate and it was possible to maintain the desired sodium hydride concentration within a tolerance of 0.1%.

An alloyed steel containing 18% chromium, 9% nickel, 0.45% titanium and less than 0.1% carbon was subjected to descaling in the above-described bath and in this manner a bright, scale-free surface was obtained on the alloyed steel.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A concentrate for use in an alkaline descaling bath consisting essentially of an alkali metal hydride and an alkali metal oxide as active descaling constituents dissolved or finely dispersed in an alkali metal hydroxide, wherein said alkali metal hydroxide is present in an amount sufficient to passivate said active descaling constituents present in said concentrate prior to the introduction thereof into a descaling bath.

2. A concentrate as defined in claim 1, in which the alkali metal is sodium.

3. A concentrate as defined in claim 2, and containing between about 5 and 50% by weight of NaH and between about 1 and 20% by weight of $Na_2O$.

4. A concentrate as defined in claim 1, and containing between about 10 and 15% alkali metal hydride and between about 8 and 14% alkali metal oxide.

5. A concentrate as defined in claim 4, in which the alkali metal is sodium.

6. A concentrate as defined in claim 1, wherein said active descaling constituents are present in an amount equal to between about 5 and 50% of the weight of said concentrate.

7. A method of preparing a reducing alkali descaling bath which comprises introducing into an alkaline descaling bath requiring additional active constituents a passivated concentrate according to claim 1.

8. A method according to claim 1, wherein said concentrate is prepared by dissolving an alkali metal hydride and an alkali metal oxide in molten alkali metal hydroxide.

9. A method according to claim 7, wherein said concentrate is introduced into said alkaline descaling bath at a temperature of said concentrate of between 0 and 450° C.

10. A method according to claim 9, wherein said concentrate is in solid form and is introduced into said alkaline descaling bath at a temperature of said concentrate of between 0 and 450° C.

11. A method according to claim 9, wherein said concentrate is in molten form and is introduced into said alkaline descaling bath at a temperature of said concentrate of between 320 and 450° C.

12. A method of preparing a reducing alkali descaling bath which comprises reacting an alkali metal hydroxide free alkali metal and hydrogen at a pressure of about 1 to 100 atmospheres and a temperature of between about 250 and 450° C. to form a concentrate of alkali metal hydride and alkali metal oxide, both in passivated form, distributed in molten alkali metal hydroxide, and introducing said concentrate into an alkaline descaling bath requiring additional active constituents.

References Cited

UNITED STATES PATENTS

| | | | |
|---|---|---|---|
| 2,717,845 | 9/1955 | Carter | 134—2 |
| 2,796,366 | 6/1957 | Carter | 134—2 |
| 3,437,598 | 4/1969 | Voldre | 134—29 |
| 3,494,793 | 2/1970 | Lenz | 134—2 |
| 3,506,487 | 4/1970 | Lenz | 134—2 |

HAROLD ANSHER, Primary Examiner

M. E. McCAMISH, Assistant Examiner

U.S. Cl. X.R.

134—2; 204—145, 146; 252—80